Sept. 26, 1950 L. T. SAWYER 2,523,924
HAIR RETAINER AND METHOD OF MAKING
Filed Jan. 15, 1948 2 Sheets-Sheet 1
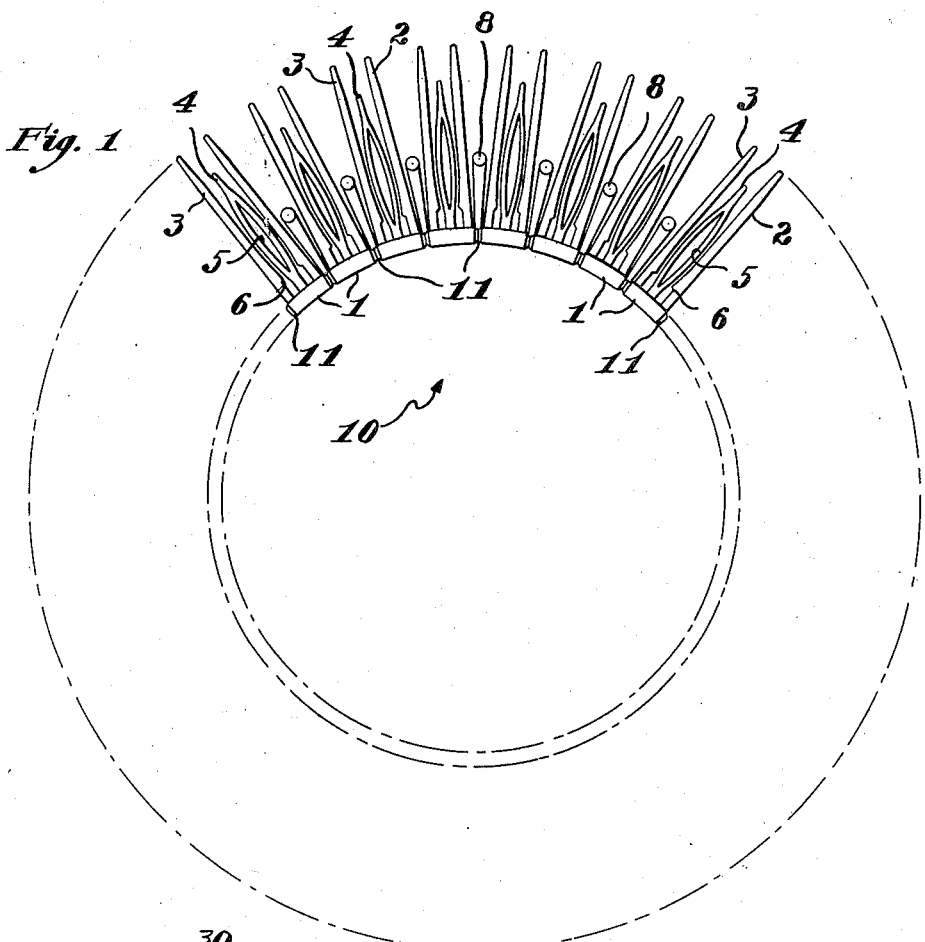
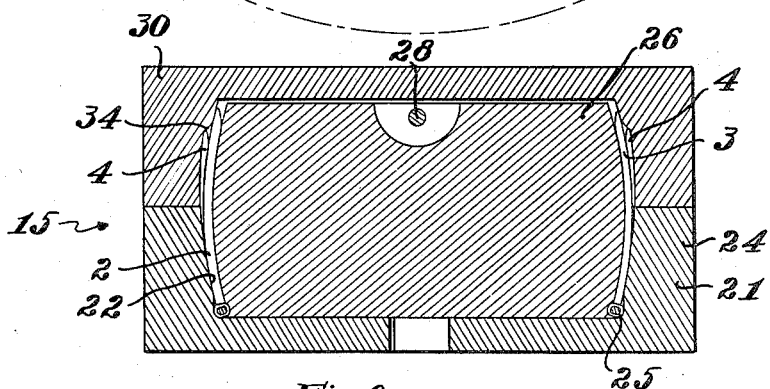
Inventor
Lester T. Sawyer
by Roberts, Cushman & Grover
Atty's Sept. 26, 1950 L. T. SAWYER 2,523,924
HAIR RETAINER AND METHOD OF MAKING
Filed Jan. 15, 1948 2 Sheets-Sheet 2
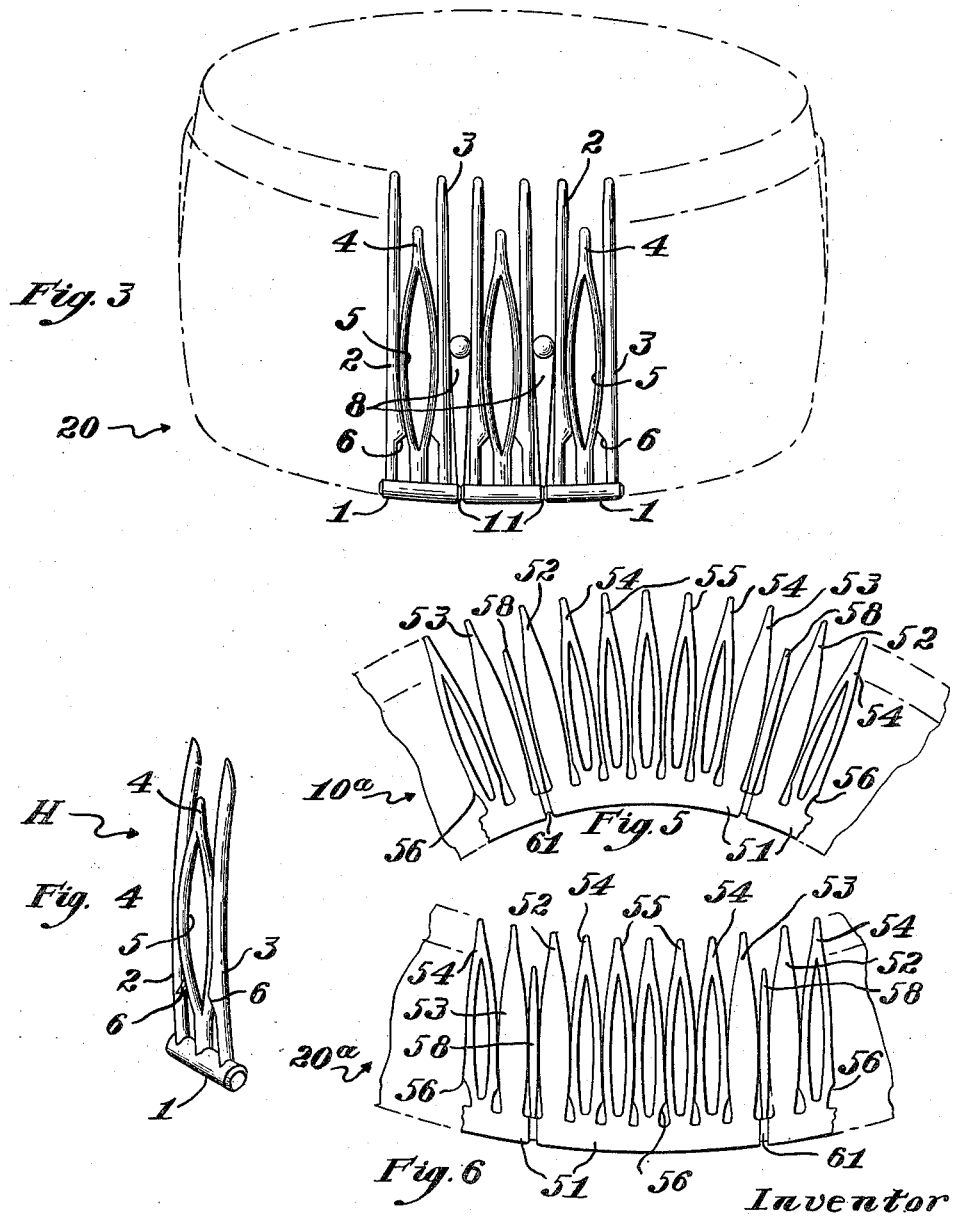
Inventor
Lester T. Sawyer
by Roberts, Cushman & Grover
Att'ys Patented Sept. 26, 1950

2,523,924

UNITED STATES PATENT OFFICE 2,523,924

HAIR RETAINER AND METHOD OF MAKING

Lester T. Sawyer, Leominster, Mass.

Application January 15, 1948, Serial No. 2,474

5 Claims. (Cl. 18—47.5)

This invention relates to the manufacture of hairpins, comb-like hair retainers and similar hair-retaining articles of the type having backs or closed ends and a plurality of projecting hair-engaging teeth, some at least of which teeth have bends or shapes to provide parts contiguous with or in hair-gripping relation to adjacent teeth, the present application being a continuation-in-part of my copending application Serial No. 649,306, filed February 21, 1946, now Patent No. 2,450,448.

In the manufacture of articles of the above type, it is a well-known practice first to form a cluster or group of such articles, as by injection molding, and thereafter to shape and finish the articles individually, as disclosed, for example, in my prior Patent No. 2,196,815, granted April 9, 1940. Although the advantages of injection molding are well known, the individual shaping and finishing of such articles not only slows down production, but also requires a large number of man-hours to handle the output of a single molding machine with a consequent increase in manufacturing costs. A further difficulty encountered in the prior practices is in properly shaping the hair retainers after forming the blank or blanks, so that their teeth are held either in contact or the desired degree of close proximity so as to exert the desired gripping action.

The principal objects of the present invention are to provide an improved hair retainer of the above type and more especially an efficient and economical method of manufacturing the same, thereby overcoming the aforementioned disadvantages. More specific objects are to provide an improved method whereby the hair gripping teeth are brought together either in actual contact or to the desired degree of proximity and to produce an improved hair retainer which is so constructed as to insure a more reliable gripping action of the hair. Further objects will be apparent from a consideration of the following disclosure.

In accordance with the present invention hair-retaining articles of the above type, hereinafter referred to as "hair-retainers," are produced from a suitable plastic material such as cellulose acetate or similar thermoplastic material, preferably of the type capable of being injection molded. A plurality of such hair-retainers are produced in the form of a substantially flat annular blank wherein the backs collectively define the inner periphery of the annular blank and the teeth extend divergently outward from the backs in out-of-contact relation with each other, their outer ends being circumferentially spaced and collectively defining the outer periphery of the annular blank. Between each hair-retainer there is provided a spreader finger or element integral with the back and projecting radially therefrom in spaced relation to the adjacent teeth at each point defining the line of severance between the adjacent interconnected hair-retainers. The annular blank thus formed consists of a plurality of interconnected hair-retainers, the individual teeth being of approximately the desired shape, but in out-of-contact relation with each other and between the end teeth of adjacent hair-retainers is a spreader finger which preferably is of enlarged cross-sectional area at a point spaced outwardly from its fixed end.

If the annular blank has been formed by injection molding or the like, immediately after discharge from the machine it is usually sufficiently plastic to be reformed or converted to generally cylindrical shape, as hereinafter described; but if the annular blank has cooled or is in relatively non-plastic condition, it may then be temporarily plasticized either by being subjected to a mild degree of heat, or to an environment containing a suitable softener or solvent, or both. In any case, while the annular blank is in relatively plastic condition, it is then applied about a generally cylindrical forming block or die so as to convert it from a substantially flat annular member to a generally cylindrical crown-like member, such conversion being effective to close the out-of-contact teeth to the desired proximity. During the conversion treatment the spreader fingers or elements are brought into engagement with the adjacent teeth so as to exert wedging action thereon which is transmitted circumferentially so as to bring the offset portions of the teeth into contiguous or gripping relation with the sides of the adjacent teeth, thereby providing hair-engaging elements adapted yieldingly to grip and hold strands of hair.

After having permitted the crown-like member to harden or assume a permanent set, the individual hair-retainers may be produced simply by severing the backs at the junction of the spreader fingers, then removing the latter, and thereafter the individual hair-retainers may be polished or otherwise finished and packed for market.

In the accompanying drawings which illustrate what is now considered a preferred procedure—

Fig. 1 is a top plan view of one form of an annular blank from which hairpin type hair retainers are produced in accordance with the present invention;

Fig. 2 is a vertical section through a generally cylindrical die for converting the annular blank of Fig. 1 into a generally cylindrical crown-like member;

Fig. 3 is a perspective view in partial detail of the crown-like member formed from the blank of Fig. 1;

Fig. 4 is a perspective view of an individual hair retainer severed from the blank of Fig. 3;

Fig. 5 is a view similar to Fig. 1, but showing an annular blank from which another type of hair retainer is produced; and Fig. 6 is a view similar to Fig. 3, showing the closed-in or converted member formed from the annular blank shown in Fig. 5.

Referring to the embodiment of Figs. 1 to 4, it is assumed that it is desired to produce by injection molding a hair retainer H which, as shown in Fig. 4, has a closed end or back 1 integral with a pair of spaced, slightly convergent, curved teeth 2 and 3 with an interposed tooth 4 of lesser length and somewhat less curved, but formed with bends or offsets 5 contiguous with or in gripping relation to the sides of the teeth 2 and 3. Each of the outer teeth 2 and 3 are preferably formed with laterally-projecting shoulders 6 which either engage or are in closely spaced relation to the adjacent bends 5 of the intermediate tooth 4. Such shoulders may project inwardly at an angle of from about 45° to about 90°, relative to the associated outer tooth, depending upon the degree of "grip" desired. For relatively coarse hair, an angle of about 45° is recommended, and for fine hair, the angle may be about 90°, and for medium hair an angle of about 60°, as here shown, is preferable.

A mold of the type illustrated in my prior Patent No. 2,196,815 is formed so as to produce one or more substantially flat annular members 10 (Fig. 1), each of which, after removal of the sprue and runners, comprises a plurality of hair-retainers and interposed spreader fingers 8, the hair-retainers having their backs 1 connected end-to-end so as collectively to define the inner periphery of the annular member. The individual hair-retainers preferably are demarked by circumferentially spaced V-shaped grooves 11 and the inner ends of the spreader fingers 8 adjoin these grooved portions. The teeth and spreader fingers extend approximately, although not necessarily literally, radially in out-of-contact relation.

The annular blank 10 is then softened, if necessary, preferably by exposure to a mild degree of heat substantially less than the liquefaction temperature of the thermoplastic material, and while in a soft and plastic condition the blank is next subjected to the action of the three part forming die 15 (Fig. 2) which converts it into a crown-like, generally cylindrical blank 20, shown in Fig. 3. The die 15 comprises a base 21 formed with a generally cylindrical recess 22 with an upwardly extending side wall 24 which diverges slightly, as shown in Fig. 2. The diameter at the base of the recess 22 is slightly less than the diameter of the inner periphery of the annular member 10, and the junction of the bottom and side walls of the recess is relieved, as indicated at 25, to accommodate the interconnected backs 1 of the blank 10.

The recess 22 receives a generally cylindrical block 26, the lower half of which is similar to, but slightly smaller than the recess 22, but the diameter of its lower end is slightly greater than the diameter of the inner periphery of the blank 10, and the upper half of the block has the same form so that the entire block presents a barrel-like contour. The surface of the side wall of the lower half of the block 26 is spaced from the side wall of the recess 22 by a distance equal to the thickness of the teeth 2—4 of blank 10 so as to impart the same curved contour thereto as that of the walls of the block and recess. The block 26 may be provided with a handle 28 by means of which it may be lifted into and out of the recess 22.

A cap 30 fits over the upper half of the block 26 with its lower edge seated on the upper face of the base 21. The cap is formed with a recess 32 similar to but slightly larger than the upper half of the block 26 and relieved, as shown at 34, to receive the upper end portions of the intermediate teeth 4 so as to impart thereto a contour slightly less curved than that of the teeth 2 and 3.

In using the forming die 15, the softened blank 10 is concentrically positioned on the upper face of the base 21 and the block 26 is then applied so as to force the inner peripheral portion of the blank 10 downwardly to the bottom of the recess 22, thereby causing the backs to be rolled a quarter turn and the teeth 2—4 to be swung upwardly. The cap 30 is next applied so that the inner end of the side wall of recess 32 engages the free end portions of teeth 2 and 3 to hold them against the side wall of the block 26, and the wall of the relieved portion 34 engages the free end portions of teeth 4 to bend them inwardly to a lesser extent than the teeth 2 and 3 as illustrated in Fig. 2.

After having permitted the die and blank to cool for a period sufficient to induce a permanent set of thermoplastic material, the cap and block are removed and the re-formed blank 20 may then be lifted from the base. It will be observed that during the conversion of the annular blank 10 into a generally cylindrical blank 20 (Fig. 3) the spreader fingers 8 act on the adjacent outer teeth, urging them toward each other, and as a result of the conversion treatment the divergent teeth are closed-in toward one another so that the offsets 5 of teeth 4 are contiguous to the teeth 2 and 3, but a curved contour is imparted to the individual teeth.

The final step consists in severing the individual hair retainers H (Fig. 4) from the blank 20 by cutting through the backs 1 at the grooves 11 and severing the spreader fingers 8, after which the hair retainers may, if desired, be polished or otherwise processed.

In Figs. 5 and 6 I have shown the application of the invention to a different type of hair-retainer and in this embodiment each hair-retainer comprises a back 51 integral with a plurality of teeth, including end teeth 52 and 53 and intermediate teeth 54 and 55. The intermediate teeth 54 and 55 are bifurcated or formed with bends and the alternate teeth 54 are formed with laterally projecting shoulders 56 which correspond with the shoulders 6 of the hair-retainer shown in Fig. 4.

In making this type of hair-retainer an annular blank 10ᵃ is formed as above desired, and each annular blank comprises a plurality of such hair-retainers and interposed spreader fingers 58. The individual hair-retainers are demarked by radial grooves 61 and the inner ends of the spreader fingers 58 adjoin the grooved portions, both the teeth and spreader finger extending approximately radially in out-of-contact relation, as in the previously described embodiment.

The annular blank 10ª is subjected to the above-described conversion treatment which results in the formation of the crown-like or generally cylindrical blank 20ª (Fig. 6), during which treatment the spreader fingers 58 effect the closing-in of the teeth 52—55, and a curved contour is imparted to each hair-retainer. By severing the backs 51 at the grooves 61 and removing the spreader fingers 58, the individual hair-retainers are produced, after which they may be polished or otherwise processed.

While I have shown and described different desirable embodiments of the invention it is to be understood that this disclosure is for the purpose of illustration and that various changes and modifications may be made without departing from the spirit and scope of the invention as set forth in the appended claims.

I claim:

1. The method of making hair-retainers of the kind which have a plurality of hair-engaging teeth projecting from a back, which method includes the steps of forming from suitable plastic material a substantially flat annular blank having an inner peripheral strip constituting a series of hair-retainer backs joined together at their ends, a series of spaced teeth extending divergently outward from the strip and spreader elements interposed between the end teeth of the hair-retainers with their inner ends adjoining the junction of said backs, bending the blank while in plastic condition from its flat form into approximately cylindrical form so that said spreader elements exert a circumferentially directed wedging action on the divergent teeth, thereby causing them to approach one another to the desired proximity, severing the backs at the junction of the inner ends of said spreader elements and removing said spreader elements, thereby to produce from the thus formed blank individual hair-retainers each having a back and a plurality of teeth.

2. The method of making hair-retainers of the kind which have a plurality of hair-engaging teeth projecting from a back, at least some of said teeth having bends in hair gripping relation to adjacent teeth, which method includes the steps of forming from suitable plastic material a substantially flat annular blank having an inner peripheral strip constituting a series of hair-retainer backs joined together at their ends, a series of spaced teeth extending divergently outward from the strip and spreader elements interposed between the end teeth of the hair-retainers with their inner ends adjoining the junction of said backs, bending the blank while in plastic condition from its flat form into approximately cylindrical form so that said spreader elements exert a circumferentially directed wedging action on the divergent teeth, thereby causing them to approach one another to the desired proximity, severing the backs at the junction of the inner ends of said spreader elements and removing said spreader elements, thereby to produce from the thus formed blank individual hair-retainers each having a back and a plurality of teeth.

3. The method of making hair-retainers of the kind which have a plurality of hair engaging teeth projecting from a back, which method includes the steps of moulding from suitable plastic material a substantially flat annular blank having an inner peripheral strip constituting a series of hair-retainer backs joined together at their ends, a series of spaced teeth extending divergently outwardly from the strip and spreader elements interposed between the end teeth of the hair-retainers with their inner ends adjoining the junction of said backs, bending the blank while in plastic condition from its flat form into approximately cylindrical form so that said spreader elements exert a circumferentially directed wedging action on the divergent teeth, thereby causing them to approach one another to the desired proximity and simultaneously impart a curvature to some of the teeth, and severing from said cylindrical form the individual hair retainers each having a back and a plurality of teeth.

4. An article of manufacture from which may be made a plurality of hair-retainers each having a back adjoining a plurality of teeth, at least some of which are shaped to provide hair engaging areas, said article comprising a substantially flat annular member, the inner periphery of which constitutes a series of interconnected backs of said hair-retainer, a plurality of teeth extending approximately radially in out-of-contact relation with each other with their outer ends circumferentially spaced so as collectively to define the outer periphery of said annular member, and spreader elements integral with the junctions of the backs, each spreader element extending approximately radially between and in spaced relation to the end teeth of adjacent hair-retainers.

5. An article of manufacture from which may be made a plurality of hair-retainers each having a back adjoining a plurality of teeth, at least some of which are shaped to provide hair engaging areas, said article comprising a substantially flat annular member, the inner periphery of which constitutes a series of interconnected backs of said hair-retainer, a plurality of teeth extending approximately radially in out-of-contact relation with each other with their outer ends circumferentially spaced so as collectively to define the outer periphery of said annular member, and spreader elements integral with the junctions of the backs, each spreader element extending approximately radially between and in spaced relation to the end teeth of adjacent hair-retainers and being of enlarged cross-section at a point spaced from its inner end.

LESTER T. SAWYER.

REFERENCES CITED

The following references are of record in the file of this patent:

UNITED STATES PATENTS

| Number | Name | Date |
|---|---|---|
| 1,893,597 | Queen | Jan. 10, 1933 |
| 2,139,541 | Farnsworth | Dec. 6, 1938 |
| 2,196,815 | Sawyer | Apr. 9, 1940 |
| 2,338,735 | Person | Jan. 11, 1944 |
| 2,450,448 | Sawyer | Oct. 5, 1948 |